(12) United States Patent
Ramanathan et al.

(10) Patent No.: US 11,558,927 B2
(45) Date of Patent: Jan. 17, 2023

(54) ENVIRONMENT AWARE NODE REDUNDANCY AND OPTIMIZED ROAMING

(71) Applicant: Cisco Technology, Inc., San Jose, CA (US)

(72) Inventors: Shankar Ramanathan, Richardson, TX (US); M. David Hanes, Lewisville, NC (US); Muhilan Natarajan, Allen, TX (US); Gonzalo Salgueiro, Raleigh, NC (US); Robert Edgar Barton, Richmond (CA); Jerome Henry, Pittsboro, NC (US); Akram Ismail Sheriff, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 16/862,738

(22) Filed: Apr. 30, 2020

(65) Prior Publication Data
US 2021/0345451 A1    Nov. 4, 2021

(51) Int. Cl.
| | | |
|---|---|---|
| H04W 84/02 | (2009.01) | |
| H04B 17/318 | (2015.01) | |
| G06N 20/00 | (2019.01) | |
| G01S 15/89 | (2006.01) | |
| G06K 9/62 | (2022.01) | |
| H04B 7/06 | (2006.01) | |
| H04W 88/06 | (2009.01) | |
| H04W 88/08 | (2009.01) | |

(52) U.S. Cl.
CPC ......... *H04W 84/02* (2013.01); *G01S 15/8979* (2013.01); *G06K 9/6256* (2013.01); *G06K 9/6262* (2013.01); *G06N 20/00* (2019.01); *H04B 7/0617* (2013.01); *H04B 17/318* (2015.01); *H04W 88/06* (2013.01); *H04W 88/08* (2013.01)

(58) Field of Classification Search
CPC ...................................................... H04L 12/50
USPC ........................................................ 370/329
See application file for complete search history.

(56) References Cited

U.S. PATENT DOCUMENTS

| | | | |
|---|---|---|---|
| 2018/0359648 A1 | 12/2018 | Saville et al. | |
| 2019/0341989 A1 | 11/2019 | Raghavan et al. | |
| 2021/0390004 A1* | 12/2021 | Kundu | G06F 9/545 |

OTHER PUBLICATIONS

International Search Report dated Jul. 15, 2021 in connection with International Patent Application No. PCT/US2021/027583.
Thi Huong Thrinh et al; "Doppler frequency compensation basing the velocity of train and high-speed railway scenario", 2019 International Conference on Advanced Technologies for Communications (ATC), IEEE, Oct. 17, 2019. pp. 155-159, XP033654434.

(Continued)

*Primary Examiner* — Dang T Ton
(74) *Attorney, Agent, or Firm* — Behmke Innovation Group LLC; Kenneth J. Heywood; Jonathon P. Western

(57) ABSTRACT

In one embodiment, a supervisory service for a wireless network obtains frequency-time Doppler profile information for an endpoint node attached to a first access point in the wireless network. The supervisory service uses the frequency-time Doppler profile information for the endpoint node as input to a machine learning model. The machine learning model is trained to output an action for the endpoint node with respect to the wireless network. The supervisory service causes the action for the endpoint node with respect to the wireless network to be performed.

16 Claims, 6 Drawing Sheets

(56) References Cited

OTHER PUBLICATIONS

Ai, et al., "Edge Computing Technologies for Internet of Things: a Primer", Digital Communications and Networks, vol. 4, Issue 2, Apr. 2018, pp. 77-86, KeAi.

Di Domenico, et al., "Exploring Training Options for RF Sensing Using CSI", IEEE Communications Magazine, vol. 56, Issue 5, pp. 116-123, May 2018, IEEE.

Pu, et al., "Whole-Home Gesture Recognition Using Wireless Signals (Demo)", SIGCOMM'13, Aug. 2013, pp. 485-486, ACM.

Pu, et al., "Whole-Home Gesture Recognition Using Wireless Signals", MobiCom'13, Proceedings of the 19th Annual International Conference on Mobile Compuing & Networking, Sep. 2013, pp. 27-38, ACM.

* cited by examiner

ENVIRONMENT AWARE NODE REDUNDANCY AND OPTIMIZED ROAMING

TECHNICAL FIELD

The present disclosure relates generally to computer networks, and, more particularly, to environment aware node redundancy and optimized roaming.

BACKGROUND

As wireless access points become increasingly ubiquitous, more and more access points are being deployed in industrial settings. Typically, this is done through the implementation of a wireless mesh, whereby access points relay communications between one another, in order to pass data to and from clients. This is in contrast to traditional enterprise wireless networks.

The environmental conditions in an industrial environment are constantly changing. This applies to a wide variety of use cases, ranging from open-pit mining, to container ports, and the like. For example, what could be perceived as perfect Line of Sight (LoS) between a node and an access point can suddenly change when there is heavy traffic of vehicles, movement of containers, etc. This can lead to a blocked LoS and sub-optimal radio frequency (RF) conditions in very tight quarters. Site surveys are also not of much help in highly dynamic and persistently traffic prone deployments. In such scenarios, nodes tend to just drop traffic suddenly, creating confusion among network administrators, who may mistake the blocked LoS issues with configuration or software-level problems.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
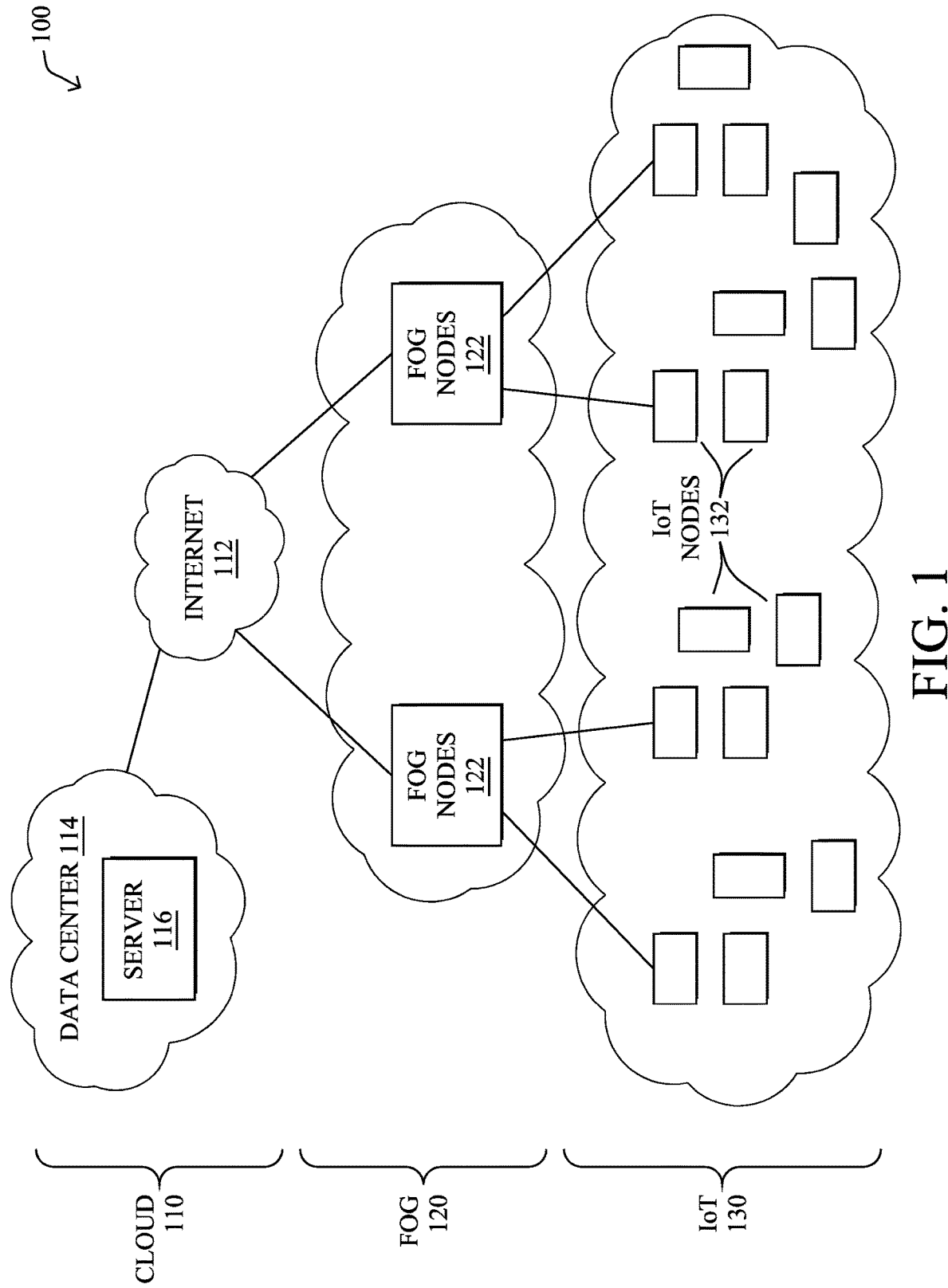
FIG. 1 illustrate an example computer network.

According to one or more embodiments of the disclosure, a supervisory service for a wireless network obtains frequency-time Doppler profile information for an endpoint node attached to a first access point in the wireless network. The supervisory service uses the frequency-time Doppler profile information for the endpoint node as input to a machine learning model. The machine learning model is trained to output an action for the endpoint node with respect to the wireless network. The supervisory service causes the action for the endpoint node with respect to the wireless network to be performed.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages) sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
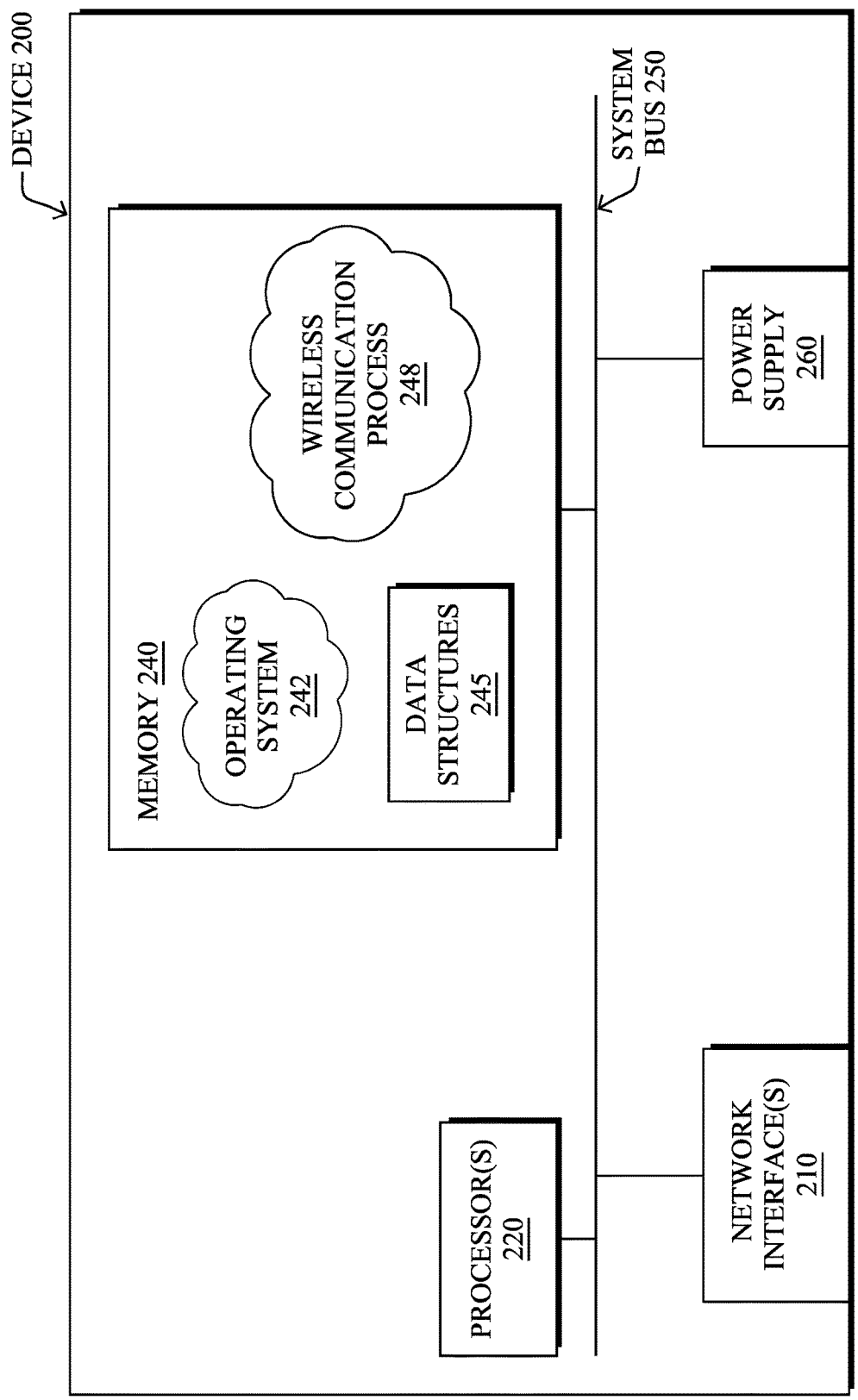
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative wireless communication process 248, as described herein. Note that while process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

During execution, wireless communication process 248 may facilitate communications between device 200 and a wireless network via network interface(s) 210. Such functionality may include, for example, scanning channels, authenticating and attaching device 200 to the wireless network, initiating roaming whereby device 200 switches from one access point in the wireless network to another access point in the wireless network, and the like. Typically, roaming is triggered when the signal quality for the current access point crosses a defined roaming threshold, thereby causing the client to seek out another access point to which it will attach. This is often due to the client moving throughout the physical location of the wireless network. For example, as the client moves away from its current access point, the received signal strength for its current access point will decrease while simultaneously increasing for another access point. Once the signal strength for its current access point crosses its defined roaming threshold, the client will switch to using the other access point, instead.

In various embodiments, wireless communication process 248 may use machine learning to determine its control actions over time (e.g., initiating roaming, scanning channels, staying on channel, etc.). In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, wireless communication process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that has been labeled as indicative of an acceptable connection with an access point. On the other end of the spectrum are unsupervised techniques that do not require a training set of labels. Notably, while a supervised learning model may look for previously seen patterns that have been labeled as such, an unsupervised model may instead look to the underlying behavior of the data, such as how sets of telemetry data are inter-related and/or change over time. Semi-supervised learning models take a middle ground approach that uses a greatly reduced set of labeled training data.

Example machine learning techniques that wireless communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression techniques, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

IoT networks are often implemented as wireless meshes. To extend wireless mesh connectivity to hardwired devices, the hardwired devices may leverage an access point bridge, such as a Workgroup Bridge (WGB) from Cisco Systems, Inc. In general, an access point bridge is a standalone unit that connects a hardwired network to the wireless mesh by communicating with another access point of the wireless network.

Figure 3:
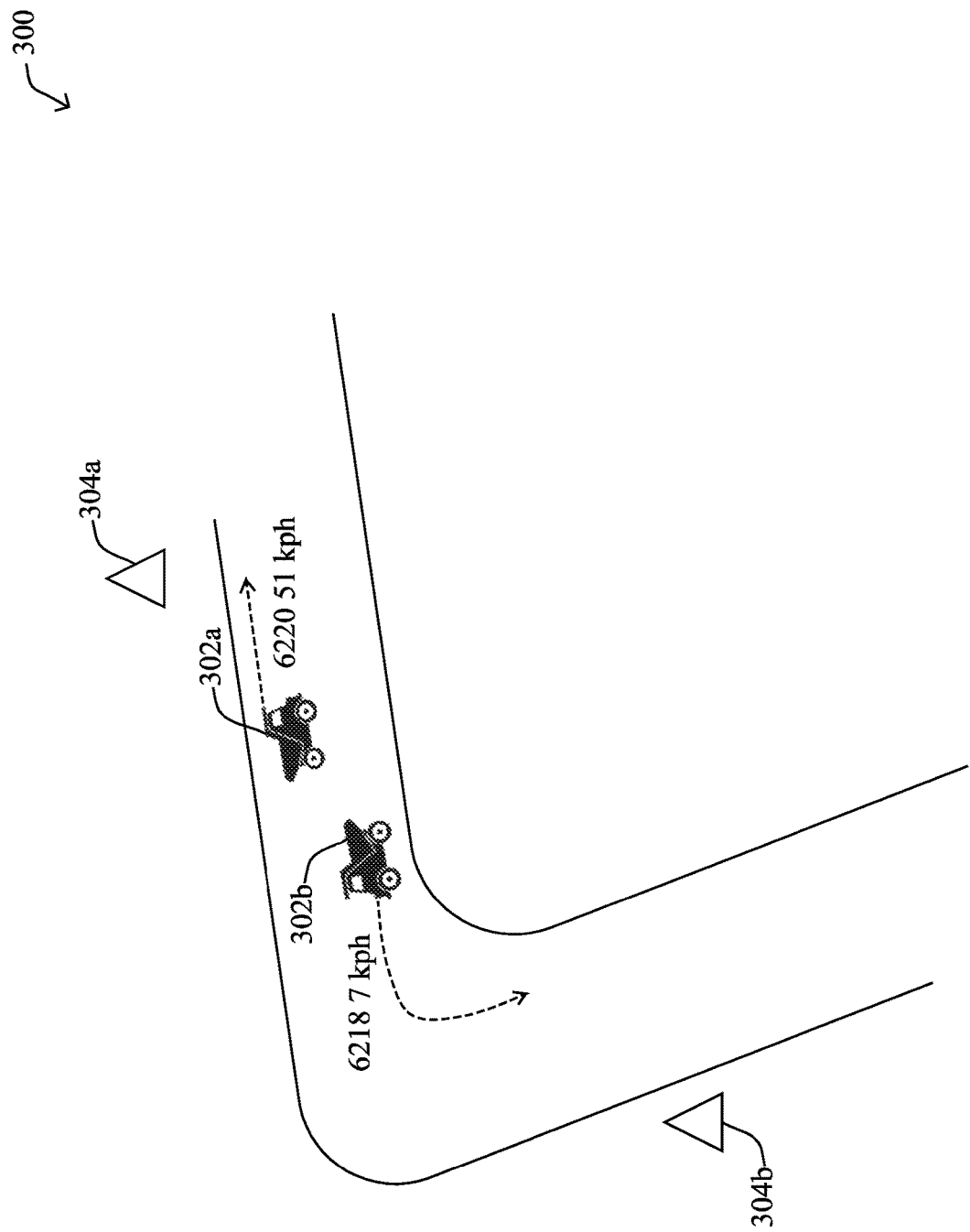
FIG. 3 illustrates an example industrial setting in which a wireless mesh network is located.

By way of example of connecting hardwired devices to a wireless mesh network, consider the case illustrated in FIG. 3. As shown, a number of vehicles 302*a*-302*b* may be deployed in an industrial setting 300. For example, if industrial setting 300 is a mine, vehicles 302*a*-302*b* may be trucks or carts. Each of vehicles 302*a*-302*b* may include its own hardwired network, such as a Controller Area Network (CAN) Bus, Ethernet, or the like, that allow the various components of the vehicle to communicate with one another. For example, a plurality of sensors on vehicle 302*a* may send sensor readings to an onboard navigation system that controls the steering and acceleration of vehicle 302*a* within industrial setting 300 via a local hardwired network of vehicle 302*a*.

As would be appreciated, different industrials settings may employ different types of nodes (e.g., vehicles 302*a*-302*b*) and the teaching herein are not limited to the use case shown. For example, nodes in other industrial setting may include, but are not limited to, autonomous vehicles (e.g., flying drones, self-driven trucks, etc.), ships, shipping containers, and the like.

Distributed throughout industrial setting 300 may be any number of wireless access points 304, such as wireless access points 304*a*-304*b*, that form a wireless mesh network.

In some embodiments, the access points 304 may be autonomous access points that self-organize into a wireless mesh. For example, certain access points 304 may function as mesh access points (MAPs) and arrange themselves into a wireless mesh rooted at a root access point (RAP).

During operation, the access point bridge local to a vehicle 302 may attach to one of the access points 304 in the wireless mesh, allowing communications to be passed wirelessly to and from the vehicle 302 and between the bridge and the wired network of the vehicle 302. As a vehicle 302 travels within industrial setting 300, it may roam from access point 304 to access point 304, based the radio signal quality observed for those access points 304.

Typically, the decision to roam from the current access point 304 being used by a vehicle 302 to another access point 304 is made by comparing the radio signal quality metrics for the access points to one or more roaming thresholds. Notably, if the received signal strength indicator (RSSI), signal-to-noise (SNR) ratio, or the like, crosses the roaming threshold, the vehicle 302 may roam to another access point 304. For example, as vehicle 302b moves away from access point 304a, its measured RSSI with access point 304a may drop below the defined roaming threshold, leading vehicle 302b to roam to another access point 304, such as access point 304b.

As noted above, the environmental conditions in an industrial environment are constantly changing. This applies to a wide variety of use cases, ranging from open-pit mining, to container ports, and the like. For example, what could be perceived as perfect Line of Sight (LoS) between a node and an access point can suddenly change when there is heavy traffic of vehicles, movement of containers, etc. This can lead to a blocked LoS and sub-optimal radio frequency (RF) conditions in very tight quarters, as well as the application(s) associated with the node becoming disconnected. Site surveys are also not of much help in highly dynamic and persistently traffic prone deployments. In such scenarios, nodes tend to just drop traffic suddenly, creating confusion among network administrators, who may mistake the blocked LoS issues with configuration or software-level problems.

By way of illustration, consider the case shown in FIG. 3. As shown, while vehicle 302b would otherwise be seen as being in the LoS of access point 304a, its orientation and the presence of vehicle 302a can lead to extremely poor RSSI due to shadowing. This effect has also been observed in real-world settings, with a particular truck in an open mine being approximately 100 feet away from an access point, but registered no signal with one antenna, while the other antenna registered a reading of −42 dBm and a total SNR of 50 db.

Environment Aware Node Redundancy and Optimized Roaming

The techniques herein leverage machine learning to provide continuous application connectivity in wireless networks, even when the node enters a temporal RF shadow area (e.g., the LoS with the access point is blocked). Such shadows commonly result in complete stoppage of the application(s) associated with the node (e.g., telemetry reporting, navigation, etc.), which can be a major disruptor in many use cases. For example, a remote-controlled truck in a mine could come to a complete stop and require manual restarting, when it loses connectivity to the wireless network. In some aspects, the techniques herein allow the node to roam early on or survive traversal of the temporal shadow zone without its application(s) disconnecting.

Illustratively, the techniques described herein may be performed by hardware, software, and/or firmware, such as in accordance with the wireless communication process 248, which may include computer executable instructions executed by the processor 220 (or independent processor of interfaces 210) to perform functions relating to the techniques described herein.

Specifically, according to various embodiments, a supervisory service for a wireless network obtains frequency-time Doppler profile information for an endpoint node attached to a first access point in the wireless network. The supervisory service uses the frequency-time Doppler profile information for the endpoint node as input to a machine learning model. The machine learning model is trained to output an action for the endpoint node with respect to the wireless network. The supervisory service causes the action for the endpoint node with respect to the wireless network to be performed.

Figure 4:
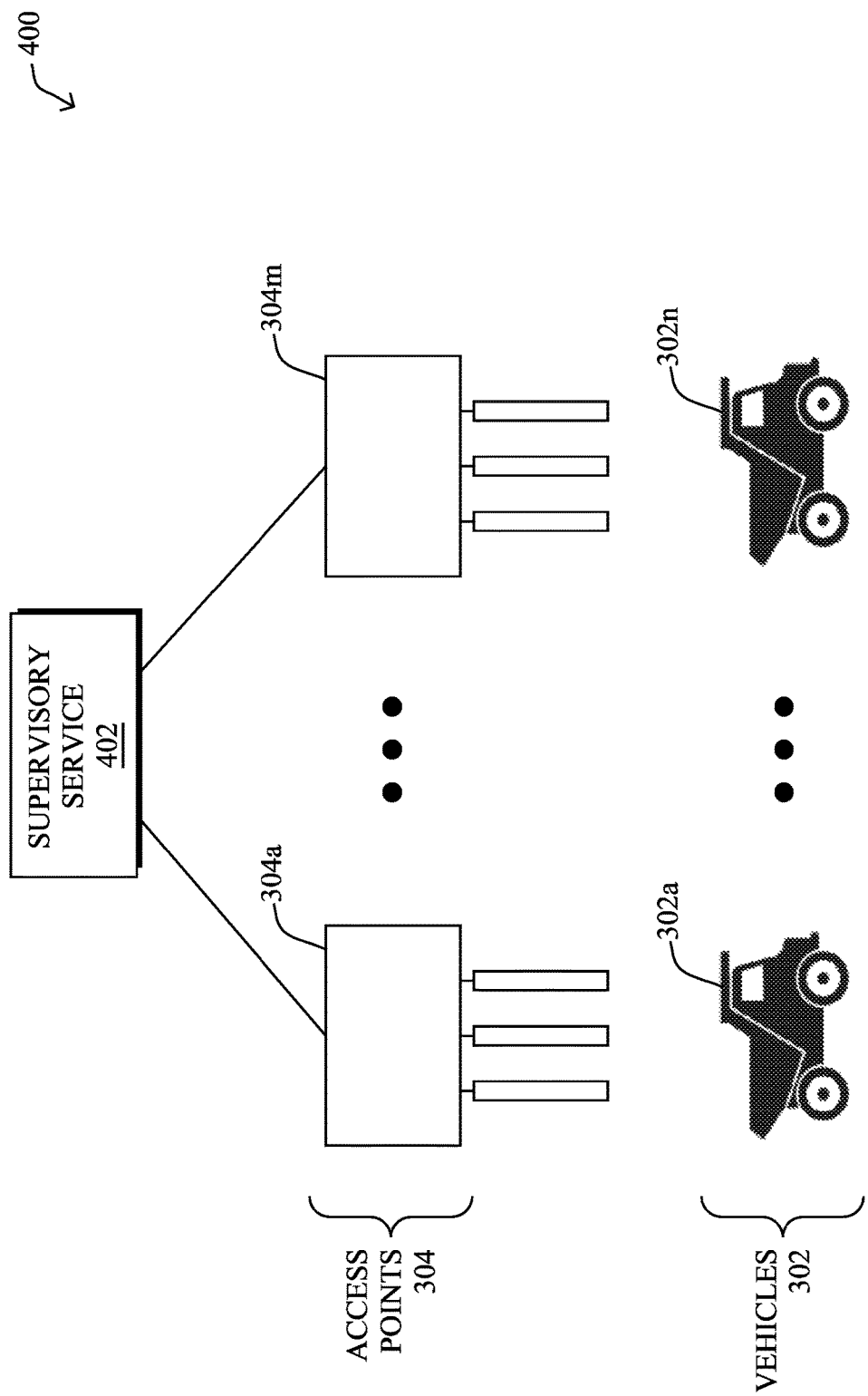
FIG. 4 illustrates an example architecture for environment aware node redundancy and optimized roaming.

Operationally, FIG. 4 illustrates an example architecture 400 for environment aware node redundancy and optimized roaming, according to various embodiments. Continuing the example of industrial setting 300, assume that there is a set of vehicles 302 that include vehicles 302a-302n (e.g., a first through $n^{th}$ vehicle) located throughout an area. Also located throughout the area may be a set of wireless access points 304, including access points 304a-304m (e.g., a first through $m^{th}$ access point).

As shown, architecture 400 may also include a supervisory service 402 that is in communication with access points 304. For example, supervisory service 402 may be a network assurance service that receives telemetry data from access points 304 indicative of key performance indicators (KPIs) for the wireless network, to assess the health of the wireless network and take corrective measures, if necessary. In addition, supervisory service 402 may also receive KPI information that can affect the performance of the application(s) associated with vehicles 302. For example, supervisory service 402 may receive KPI telemetry data indicative of observed SNR, RSSI, retry counts, network throughput, and the like. In some cases, the network interfaces of vehicles 302 may also report KPI data to supervisory service 402.

According to various embodiments, supervisory service 402 may also receive location data indicative of the physical locations of vehicles 302. In one embodiment, each vehicle 302 may be equipped with a Global Positioning System (GPS) receiver and report, via its WGB or other wireless interface communicating with an access point 304, its GPS coordinates to supervisory service 402. In other embodiments, access points 304 may estimate the locations of vehicles 302 through the use of triangulation or another location estimation approach, and report the location data to supervisory service 402. Such location data may also be timestamped, allowing supervisory service 402 to track the locations of vehicles 302 throughout the area over time. In further embodiments, supervisory service 402 may also obtain location information regarding vehicles 302 through the use of pressure and/or motion sensors distributed throughout the area or at critical/strategic locations, video imagery, or the like.

Another form of data that supervisory service 402 may also obtain from the wireless network may include Doppler spectrum information captured by access points 304 regarding vehicles 302. More specifically, recent work has indicated that it is possible to identify different gestures of a human based on RF/channel state information (CSI). To do so, different frequency-time Doppler profiles are generated from the RF/CSI data from access points and associated with the various gestures of interest (e.g., a circle gesture, a pushing gesture, a kicking gesture, etc.). In some embodiments, the techniques herein propose extending this gesture recognition approach to the nodes in a wireless network, such as vehicles 302. For example, the various frequency-time Doppler profiles may indicate the various states of vehicles 302, such as fully facing an access point 304, facing away from an access point 304, partially obstructed by an object (e.g., another vehicle 302, a fixture, a physical etc.), etc.

More specifically, Doppler shift is the change in frequency of a wave as the source and point of observation move relative to one another. This leads to the following relationship with respect to a point object moving at velocity v and at an angle θ from the receiver:

$$\Delta f \propto \frac{2v \cos \theta}{c} f$$

where f is the frequency of the wave, c is the speed of light, and Δf is the change in frequency.

In the case of orthogonal frequency-division multiplexing (OFDM), which is used in a wide variety of wireless network protocols (e.g., 802.11a/g/n, WiMAX, etc.), OFDM is used to create multiple sub-channels and modulate the data on each sub-channel. An OFDM time-domain symbol is then generated by the sender by applying a fast Fourier transformation (FFT) on the sequence of bits modulated and transmitted on each sub-channel. When the same OFDM symbol is repeatedly used by the transmitter, the transmitter may effectively generate multiple narrowband signals that are centered at each sub-channel. In this scenario, a large FFT can be used to track such a narrowband signal, to capture the Doppler shifts across the various sub-channels. However, repeating the OFDM symbol will also decrease the bandwidth of each sub-channel.

In further cases, arbitrary OFDM symbols can be used by leveraging a data equalizing re-encoder, which converts the arbitrary OFDM symbols into the same symbol. To do so, such a re-encoder may apply an FFT to each time-domain OFDM symbol, to convert it into the frequency domain. Then, the receiver decodes the modulated bits per sub-channel and reconstructs the transmitted bits by demodulating them and applying a convolutional/Viterbi decoder. With the modulated bits, the receiver can then convert each bit into the first OFDM symbol used and equalize each of the subsequent OFDM symbols with the first symbol. Applying an inverse FFT (IFFT) to each of the equalized symbols will result in the same scenario above as with the sender using the same OFDM symbols, but without the corresponding loss of bandwidth. To avoid the pilot bits of the OFDM symbols from correcting for any frequency changes as a result of the vehicle 302, the receiver may also reintroduce the phase and amplitude changes during the application of the IFFT, which had been previously removed by the decoder.

A frequency-time Doppler profile (in dB) can be extracted by computing a sequence of FFTs over samples of the symbols. For example, computing an FFT over the first half second interval will give a Doppler resolution of 2 Hertz, which is sufficient to identify gestures by a human. Other intervals can be selected, as desired, depending on the nodes of interest, such as vehicles 302. This process can then be repeated periodically on the samples (e.g., at 5 ms intervals), to generate the overall frequency-time Doppler profile. These Doppler profiles can then be associated with different movements and orientations of the nodes in the wireless network.

In some embodiments, the frequency-time Doppler profile information can be computed either directly on the access points 304 and provided to supervisory service 402. Alternatively, the raw RF data can be provided by access points 304 supervisory service 402, which supervisory service 402 can use to compute the Doppler profiles.

As a result of this data collection, supervisory service 402 may construct a database that associates the collected KPI telemetry data from the wireless network with the corresponding locations, movements (e.g., velocities, etc.), and/or orientations of vehicles 302 at that time. By doing so, supervisory service 402 may learn over time which locations and vehicle orientations are associated with lowered KPIs and application performance.

In various embodiments, to address the issue of RF shadowing and other environmental conditions, supervisory service 402 may train a machine learning model using its collected data. For example, the training dataset for the model may include the collected vehicle position data, Doppler traffic load data, access point association information, and the like. Once trained, supervisory service 402 may process the relative positions of each vehicle 302 to its neighboring (and associated) access point 304, using the trained model to get a high level picture of which vehicle 302 is going to be in a shadow zone, prior to that vehicle 302 arrives at the shadow zone.

For example, supervisory service 402 may calculate where a vehicle 302 will be located, based on is speed, path and lane taken, etc., and project the Doppler plots based on previously learned combinations. If these Doppler projections appear close to problematic Doppler plots, supervisory service 402 can initiate corrective measures. For example, if there is a high congestion of vehicles 302 in an area prone to shadowing, the machine learning model of supervisory service 402 may identify such a condition.

In another embodiment, supervisory service 402 may also leverage data from cameras deployed in the network, to identify the position of the interface antennas of vehicles 302 (e.g., relative to the body of the vehicle and its surrounding access points 304). This embodiment is optional, but can speed up the learning phase for the model in new environments (e.g., a new pit configuration for the mine, moved access points 304, etc.).

In general, any corrective measures initiated by supervisory service 402 may seek to anticipate a connectivity issue before it occurs and move the corresponding vehicle 302 to a favorable access point 304 before the vehicle 302 reaches the shadow area. In some embodiments, the corrective measures can be two phased:

1. Client Side: At the client side, vehicles 302 may avoid roaming to an access point 304 associated with a shadow zone, which can be risky, and stick with its current access point 304 or next best access point 304 not impacted by non-LoS. In this embodiment, the client WGB or other wireless interface receives an instruction from supervisory service 402 with an action to be taken. For example, supervisory service 402 may instruct a particular vehicle 302 to roam now, temporarily adjust its RSSI roaming threshold to a value X (e.g., to increase the likelihood of the vehicle 302 roaming or, conversely, its 'stickiness' to its current access point 304), changing its retry max count to Y (e.g., to trigger roaming before the shadow zone as a result of failures or surviving the shadow zone without recording a failure), combinations thereof, of the like.

2. Infrastructure Side: At the infrastructure side, supervisory service 402 may also instruct access points 304 to suppress probe requests/responses from the at-risk node, to prevent that vehicle 302 from roaming, similar to how band selection and load balancing may be performed in a wireless network. In another case, supervisory service 402 may instruct access points 304 to use beamforming techniques, such as partial nulling, to force the vehicle 302 to roam early and in advance of arriving at the shadow zone. In further cases, supervisory service 402 may instruct access points 304 to leverage 802.11v techniques, such as by using Basic Service Set (BSS) transition management and Disassociation Imminent functionalities to influence the roaming of vehicles 302 in advance of arriving at a shadow zone.

In another embodiment, because the model of supervisory service 402 can predict an interruption to connectivity or delay of data to an application server, supervisory service 402 may notify the application server to use more buffering while the vehicle 302 is located in a shadow zone and that there will be a burst of data when communications resume. This allows the application to better handle these situations and gives the network more flexibility in proactively adjusting to these occurrences. This embodiment can be realized at the application Layer or, for TCP-based applications, by manipulating the session TCP parameters (e.g., later/early acks, etc.).

Figure 5:
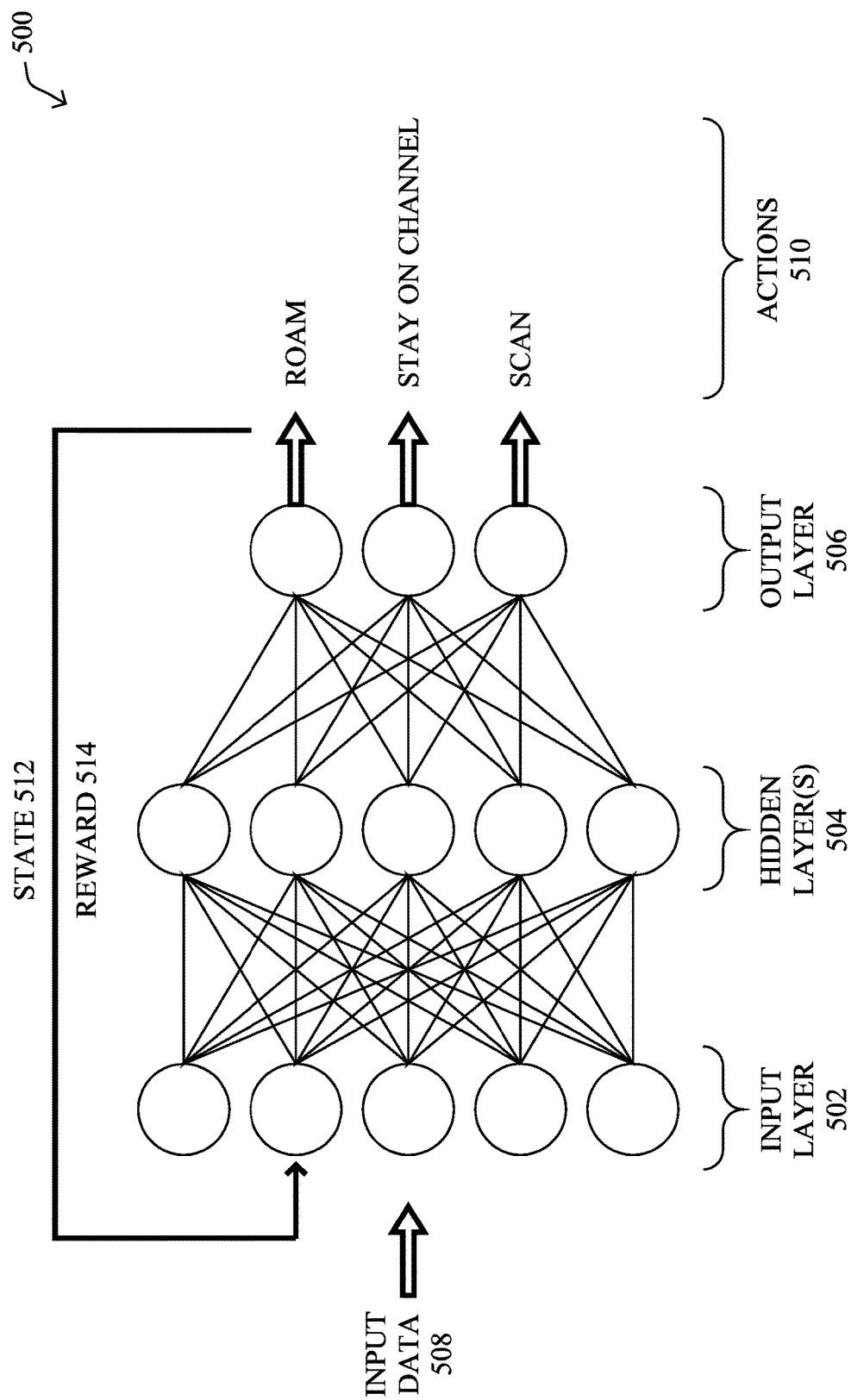
FIG. 5 illustrates an example machine learning model.

FIG. 5 illustrates an example machine learning model 500 that supervisory service 402 may use, to control its initiation of corrective measures, according to various embodiments. As shown, machine learning model 500 may take the form of a neural network, such as a convolutional neural network (CNN), comprising an input layer 502, one or more hidden layers 504, and an output layer 504.

During execution, supervisory service 402 may provide input data 508 to input layer 502 of machine learning model 500. Such input data 508 may comprise any or all of the data collected or otherwise obtained by supervisory service 402. For example, input data 508 may include the frequency-time Doppler profile information collected about a vehicle 302, its location information, and the like. In turn, output layer 506 may output one of several actions that can be taken with respect to the vehicle 302, prior to the vehicle 302 arriving at any shadow zone in the area.

As shown, actions 510 may include any or all of the following:

Roam—This action may indicate that the vehicle 302 should roam to a different access point 304, in advance of arriving at the shadow zone. When this action is selected by machine learning model 500, supervisory service 402 may send appropriate instructions to access points 304 and/or to the affected vehicle 302, to cause the vehicle 302 to roam (e.g., by lowering its RSSI roaming threshold, causing the current access point 304 to use beamforming to cause roaming, etc.).

Stay on Channel—This action may indicate that the vehicle 302 should stay on its current channel and attached to its current access point 304. In some cases, this action may be coupled with infrastructure side measures, such as alerting the application server as to an upcoming delay in data from the vehicle 302.

Scan—This action may indicate that the vehicle 302 should perform a channel scan, to identify other access points 304 in the nearby area.

In some embodiments, machine learning model 500 may also use reinforcement learning, to continuously improve its efficacy. For example, as the vehicle 302 moves and actions 510 are effected in the wireless network, the environment state will also change. Consequently, supervisory service 402 will capture additional state data 512. Supervisory service 402 may also evaluate a reward function that evaluates whether the taken action 510 produced a desirable result (e.g., the vehicle 302 did not lose connectivity while in the shadow zone, etc.) or an undesirable result (e.g., the vehicle 302 still lost connectivity). Such state data 512 and reward data 514 can be fed as input to machine learning model 500, so as to maximize the reward function and learn over time which actions 510 to select under certain conditions.

Figure 6:
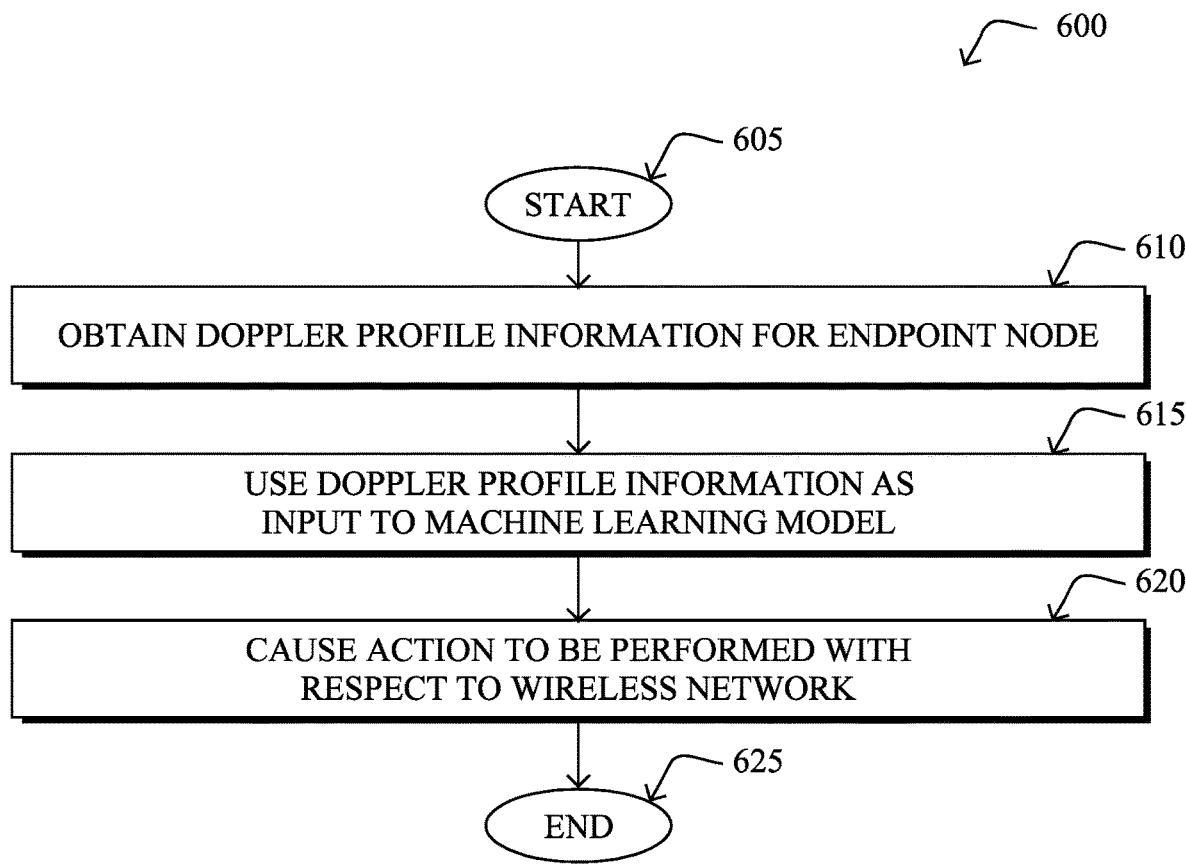
FIG. 6 illustrates an example simplified procedure for controlling operations in a wireless network.

FIG. 6 illustrates an example simplified procedure for controlling operations in a wireless network, in accordance with one or more embodiments described herein. The procedure 600 may start at step 605, and continues to step 610, where, as described in greater detail above, a device (e.g., device 200) may execute stored instructions (e.g., process 248), to provide a supervisory service to a wireless network. The supervisory service obtains frequency-time Doppler profile information for an endpoint node attached to a first access point in the wireless network. For example, such an endpoint node may comprise a truck or other vehicle, a shipping container, or the like, that moves through the location of the wireless network. In general, the frequency-time Doppler profile information may be indicative of an orientation and/or movement of the endpoint node, as well as any other nearby endpoint nodes or other objects, potentially. For example, in the case of a truck, certain orientations of its bed relative to its access point may obstruct signals from the access point, even though the truck is within the LoS of the access point, and this configuration may be associated with a particular Doppler profile. In various embodiments, the supervisory service may obtain the Doppler profile information either directly from one or more access points in the wireless network or may compute the Doppler profile information using telemetry data obtained therefrom.

At step 615, as detailed above, the supervisory service may use the frequency-time Doppler profile information as input to a machine learning model. In various embodiments, the machine learning model is trained to output an action for the endpoint node with respect to the wireless network. For example, such an action may indicate that the endpoint node should roam to a second wireless access point in the network, such as in the case of the endpoint node approaching a shadow zone. In other cases, the action may indicate that the endpoint node should remain attached to its current access point while traversing the shadow zone. In a further case, the action may indicate that the endpoint node should begin scanning channels. In some embodiments, the model may be further trained using GPS data collected from endpoint nodes in the network, camera data (e.g., indicative of the locations and orientations of endpoint nodes), or the like.

At step 620, the supervisory service may cause the action for the endpoint node to be performed, as described in greater detail above. In various embodiments, the supervisory service may do by sending instructions directly to the endpoint node and/or to the access point(s) in the wireless network within range of the endpoint node. For example, in the case of the action comprising the endpoint node roaming to a second access point, in advance of the endpoint node arriving at a shadow zone in the wireless network, the supervisory service may instruct the node to increase its RSSI roaming threshold, decrease its maximum retry count, or simply instruct the node to roam. Conversely, the service may instruct the first access point to force the endpoint node to begin roaming, such as by using beamforming (e.g., using partial nulling) or an 802.11v indicator. In further cases, the service may instead determine that the endpoint node should remain attached to the first access point while traversing the shadow zone. In such cases, the service may instruct the node to decrease its RSSI roaming threshold or increase its maximum retry count, or instruct one or more access points to suppress probe responses to the endpoint node (e.g., so that the node cannot roam). In a further embodiment, the service may also notify an application server that communicates with the endpoint node to initiate buffering of communications with the endpoint node, such as in the case where the node is entering a known shadow zone. Procedure 600 then ends at step 625.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow machine learning to be used to mitigate or avoid potential connectivity issues in a wireless network, particularly those that are the result of shadow zones in the network. In some aspects, frequency-time Doppler profile information can be used to determine the movements and orientations of the endpoint nodes in the network and this information can be fed to a machine learning model, to identify a corrective measure.

While there have been shown and described illustrative embodiments, it is to be understood that various other adaptations and modifications may be made within the intent and scope of the embodiments herein. For example, while the techniques herein are described primarily with respect to certain types of endpoint clients of a wireless network, such as trucks and other vehicles, the techniques herein are not limited as such and can be adapted for use with any other form of movable endpoint clients, as well. Further, while certain protocols are used herein for illustrative purposes, such as 802.11v, the techniques herein can also be implemented using other suitable protocols.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
obtaining, by a supervisory service for a wireless network, frequency-time Doppler profile information for an endpoint node attached to a first access point in the wireless network;
using, by the supervisory service, the frequency-time Doppler profile information for the endpoint node as input to a machine learning model, wherein the machine learning model is trained to output an action for the endpoint node with respect to the wireless network; and
causing, by the supervisory service, the action for the endpoint node with respect to the wireless network to be performed,
wherein the action for the endpoint node with respect to the wireless network comprises: a) the endpoint node roaming to a second access point, in advance of the endpoint node arriving at a shadow zone in the wireless network, or b) the endpoint node staying attached to the first access point and while traversing the shadow zone in the wireless network.

2. The method as in claim 1, wherein causing the action for the endpoint node to be performed comprises:
instructing the endpoint node to roam to the second access point in the wireless network, to increase its received signal strength indicator (RSSI) roaming threshold, or to decrease its maximum retry count.

3. The method as in claim 1, wherein causing the action for the endpoint node to be performed comprises:
instructing the first access point to force the endpoint node to roam to the second access point using beamforming or an 802.11v indicator.

4. The method as in claim 1, further comprising:
obtaining state information from the wireless network, after performance of the action; and
adjusting the machine learning model using the state information and reinforcement learning.

5. The method as in claim 1, wherein causing the action for the endpoint node to be performed comprises:
instructing one or more access points in the wireless network to suppress probe responses to the endpoint node.

6. The method as in claim 1, wherein causing the action for the endpoint node to be performed comprises:
instructing the endpoint node to decrease its received signal strength indicator (RSSI) roaming threshold or increase its maximum retry count.

7. The method as in claim 1, further comprising:
notifying an application server that communicates with the endpoint node to initiate buffering of communications with the endpoint node.

8. The method as in claim 1, wherein the machine learning model was trained based in part on global positioning system (GPS) data from endpoint nodes in the wireless network or on camera data from cameras deployed to a location of the wireless network.

9. An apparatus, comprising:
one or more network interfaces to communicate with a wireless network;
a processor coupled to the one or more network interfaces and configured to execute one or more processes; and
a memory configured to store a process that is executable by the processor, the process when executed configured to:

obtain frequency-time Doppler profile information for an endpoint node attached to a first access point in the wireless network;

use the frequency-time Doppler profile information for the endpoint node as input to a machine learning model, wherein the machine learning model is trained to output an action for the endpoint node with respect to the wireless network; and cause the action for the endpoint node with respect to the wireless network to be performed, wherein the action for the endpoint node with respect to the wireless network comprises: a) the endpoint node roaming to a second access point, in advance of the endpoint node arriving at a shadow zone in the wireless network, or b) the endpoint node staying attached to the first access point and while traversing the shadow zone in the wireless network.

10. The apparatus as in claim 9, wherein the apparatus causes the action for the endpoint node to be performed by:

instructing the endpoint node to roam to the second access point in the wireless network, to increase its received signal strength indicator (RSSI) roaming threshold, or to decrease its maximum retry count.

11. The apparatus as in claim 9, wherein the apparatus causes the action for the endpoint node to be performed by:

instructing the first access point to force the endpoint node to roam to the second access point using beamforming or an 802.11v indicator.

12. The apparatus as in claim 9, wherein the process when executed is further configured to:

obtain state information from the wireless network, after performance of the action; and adjust the machine learning model using the state information and reinforcement learning.

13. The apparatus as in claim 9, wherein the apparatus causes the action for the endpoint node to be performed by:

instructing one or more access points in the wireless network to suppress probe responses to the endpoint node.

14. The apparatus as in claim 9, wherein the process when executed is further configured to:

notify an application server that communicates with the endpoint node to initiate buffering of communications with the endpoint node.

15. The apparatus as in claim 9, wherein the machine learning model was trained based in part on global positioning system (GPS) data from endpoint nodes in the wireless network or on camera data from cameras deployed to a location of the wireless network.

16. A tangible, non-transitory, computer-readable medium storing program instructions that cause a supervisory service for a wireless network to execute a process comprising:

obtaining, by the supervisory service for a wireless network, frequency-time Doppler profile information for an endpoint node attached to a first access point in the wireless network;

using, by the supervisory service, the frequency-time Doppler profile information for the endpoint node as input to a machine learning model, wherein the machine learning model is trained to output an action for the endpoint node with respect to the wireless network; and causing, by the supervisory service, the action for the endpoint node with respect to the wireless network to be performed, wherein the action for the endpoint node with respect to the wireless network comprises: a) the endpoint node roaming to a second access point, in advance of the endpoint node arriving at a shadow zone in the wireless network, or b) the endpoint node staying attached to the first access point and while traversing the shadow zone in the wireless network.

* * * * *